(12) United States Patent
Brooks-Wilson et al.

(10) Patent No.: US 12,150,918 B2
(45) Date of Patent: Nov. 26, 2024

(54) MEDICATION BOX ASSEMBLY

(71) Applicants: Ronda Brooks-Wilson, Ypsilanti, MI (US); Paul Wilson, Ypsilanti, MI (US)

(72) Inventors: Ronda Brooks-Wilson, Ypsilanti, MI (US); Paul Wilson, Ypsilanti, MI (US)

( * ) Notice: Subject to any disclaimer, the term of this patent is extended or adjusted under 35 U.S.C. 154(b) by 86 days.

(21) Appl. No.: 18/118,787

(22) Filed: Mar. 8, 2023

(65) Prior Publication Data
US 2024/0299255 A1 Sep. 12, 2024

(51) Int. Cl.
*A61J 7/04* (2006.01)
*A61J 7/00* (2006.01)
*G01G 19/52* (2006.01)
*H01M 10/42* (2006.01)
*H01M 50/202* (2021.01)
*H01M 50/247* (2021.01)

(52) U.S. Cl.
CPC ............. *A61J 7/04* (2013.01); *A61J 7/0084* (2013.01); *G01G 19/52* (2013.01); *H01M 10/425* (2013.01); *H01M 50/202* (2021.01); *H01M 50/247* (2021.01); *A61J 2200/74* (2013.01); *A61J 2205/30* (2013.01); *A61J 2205/70* (2013.01); *H01M 2220/30* (2013.01)

(58) Field of Classification Search
CPC ........ A62J 2200/74; A61J 7/04; A61J 7/0084; A61J 2205/30; A61J 2205/70; A61J 2200/74; G01G 19/52
See application file for complete search history.

(56) References Cited

U.S. PATENT DOCUMENTS

| | | | |
|---|---|---|---|
| 6,749,319 B1 | 6/2004 | Muse | |
| 8,108,068 B1 * | 1/2012 | Boucher | G01G 17/00 700/240 |
| 8,193,918 B1 * | 6/2012 | Shavelsky | A61J 7/04 700/242 |
| 8,384,517 B2 * | 2/2013 | Chu | G06K 17/0022 340/613 |
| 8,744,620 B2 | 6/2014 | Shavelsky | |
| 8,773,261 B2 | 7/2014 | Bowers | |
| 9,317,663 B2 | 4/2016 | Dickie | |
| 9,734,696 B1 | 8/2017 | Smoot | |
| 9,770,390 B2 * | 9/2017 | Aggarwal | A61J 7/0069 |
| 9,808,403 B2 * | 11/2017 | Panzini | G16H 20/13 |
| 10,653,583 B1 * | 5/2020 | Walker | A61J 7/0427 |
| D898,346 S | 10/2020 | Lee | |
| 11,890,258 B2 * | 2/2024 | Wingate, III | H04W 4/80 |
| 11,992,466 B2 * | 5/2024 | Ozolins | A61J 1/1412 |

(Continued)

FOREIGN PATENT DOCUMENTS

CA 2921239 2/2015

*Primary Examiner* — John A Tweel, Jr.

(57) ABSTRACT

A medication box assembly includes a pill box that has a plurality of compartments each integrated into the pill box to contain pills. A plurality of covers is each hingedly disposed on the pill box for opening and closing the compartments. A lid is hingedly coupled to the pill box for opening and closing the pill box. A weight sensor is integrated into the pill box to sense weight of the pills in the compartments. An alert is integrated into the lid and the alert is in communication with the weight sensor. The alert is actuated when the weight sensor senses a weight that is below a pre-determined trigger weight to communicate that the number of pills in the compartments has fallen below a minimum amount.

8 Claims, 4 Drawing Sheets

(56) References Cited

U.S. PATENT DOCUMENTS

2017/0074717 A1* 3/2017 Pilkington ............. G01G 21/22
2017/0076060 A1* 3/2017 Pilkington ............. G16H 50/30
2020/0103270 A1* 4/2020 Pilkington ............. A61J 7/0084

* cited by examiner

MEDICATION BOX ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to a medication box device and more particularly pertains to a new medication box device for audibly alerting a user that medication stored in the medication box has fallen below a pre-determined weight. The device includes a pill box and a weight sensor integrated into the pill box for determining the weight of pills in the pill box. The device includes an alert that emits an audible alarm when the weight sensor senses a weight that is below a pre-determined weight to remind a user to refill the pill box.

(2) Description of Related Art Including Information Disclosed Under 37 CFR 1.97 and 1.98

The prior art relates to medication box devices including a box with a motion activated light emitter. The prior art discloses an automated pill box device that includes pill compartments that are electronically opened at predetermined times. The prior art discloses an electronic pill box device that is programmable to emitting various audible messages. The prior art discloses an electronic pill box that is in wireless communication with a personal electronic device. The prior art discloses an electronic pill box device that emits an audible reminder to take pills stored in electronic pill box.

BRIEF SUMMARY OF THE INVENTION

An embodiment of the disclosure meets the needs presented above by generally comprising a pill box that has a plurality of compartments each integrated into the pill box to contain pills. A plurality of covers is each hingedly disposed on the pill box for opening and closing the compartments. A lid is hingedly coupled to the pill box for opening and closing the pill box. A weight sensor is integrated into the pill box to sense weight of the pills in the compartments. An alert is integrated into the lid and the alert is in communication with the weight sensor. The alert is actuated when the weight sensor senses a weight that is below a pre-determined trigger weight to communicate that the number of pills in the compartments has fallen below a minimum amount.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
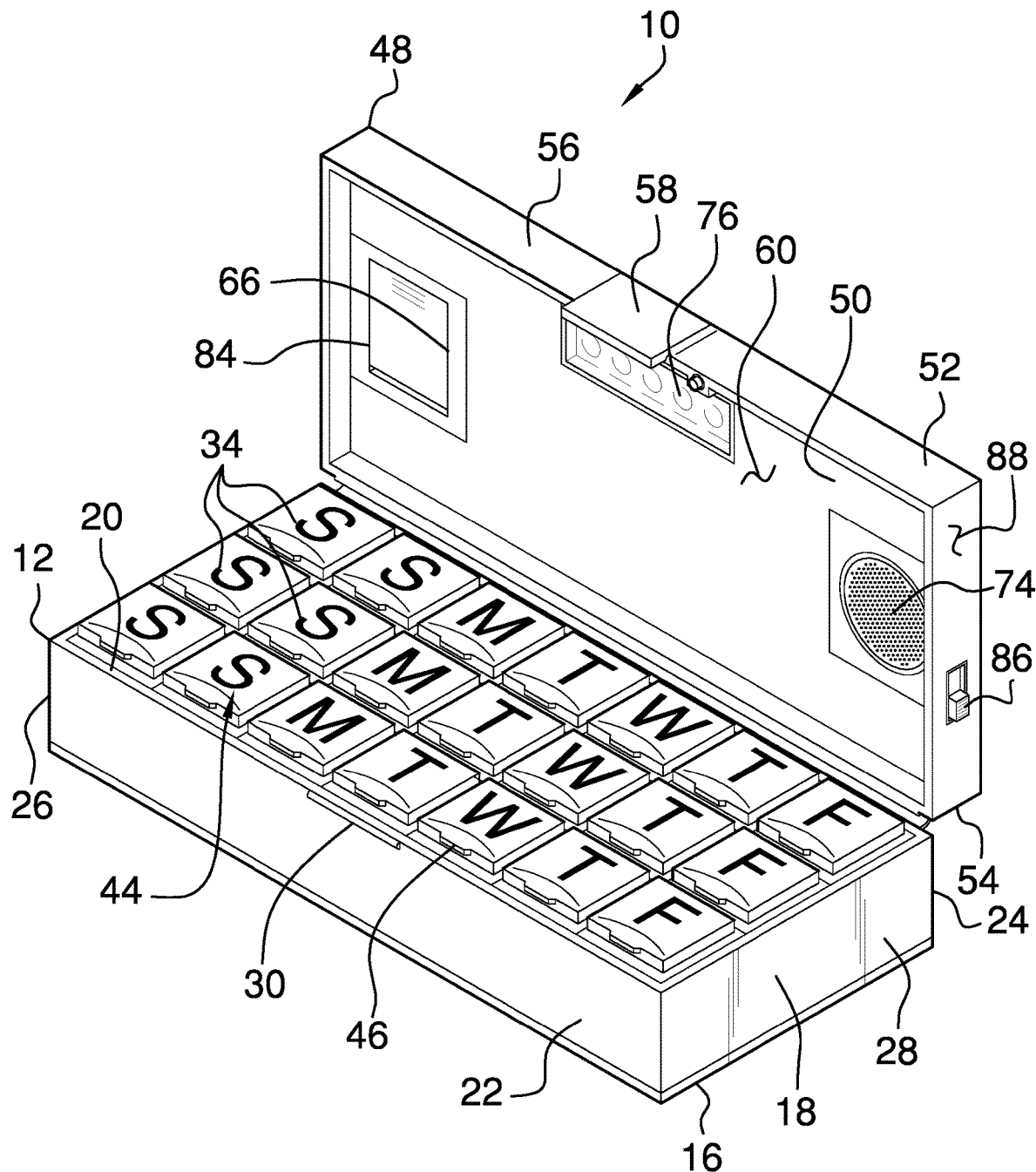
FIG. 1 is a front perspective view of a medication box assembly according to an embodiment of the disclosure.
Figure 2:
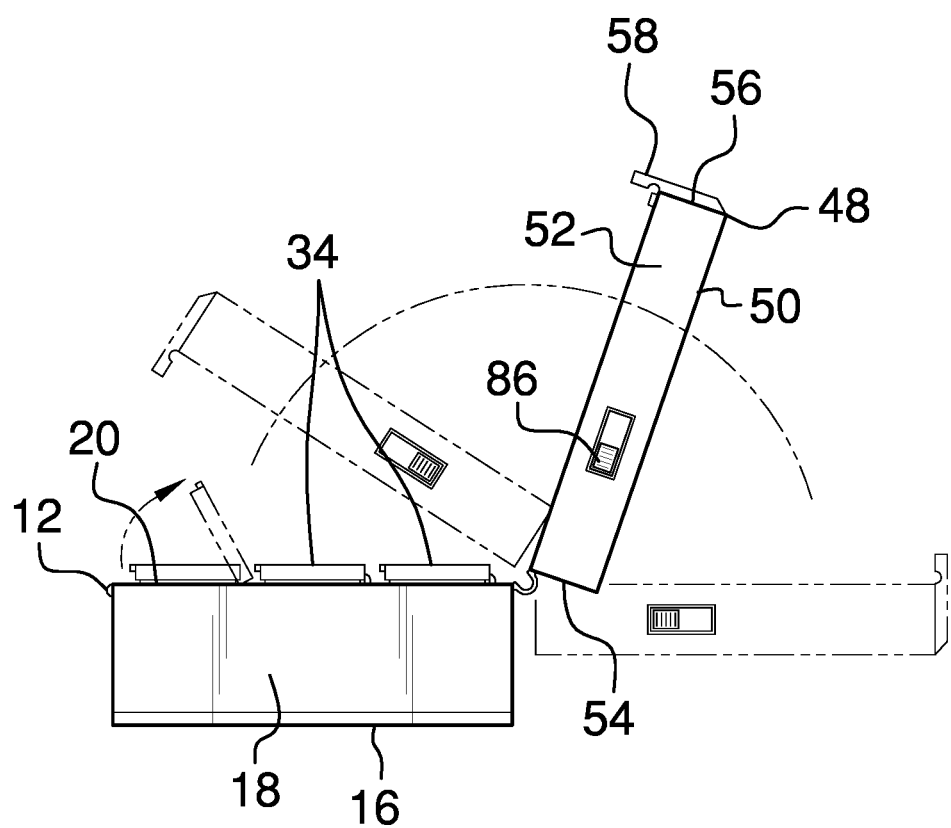
FIG. 2 is a left side view of an embodiment of the disclosure.
Figure 3:
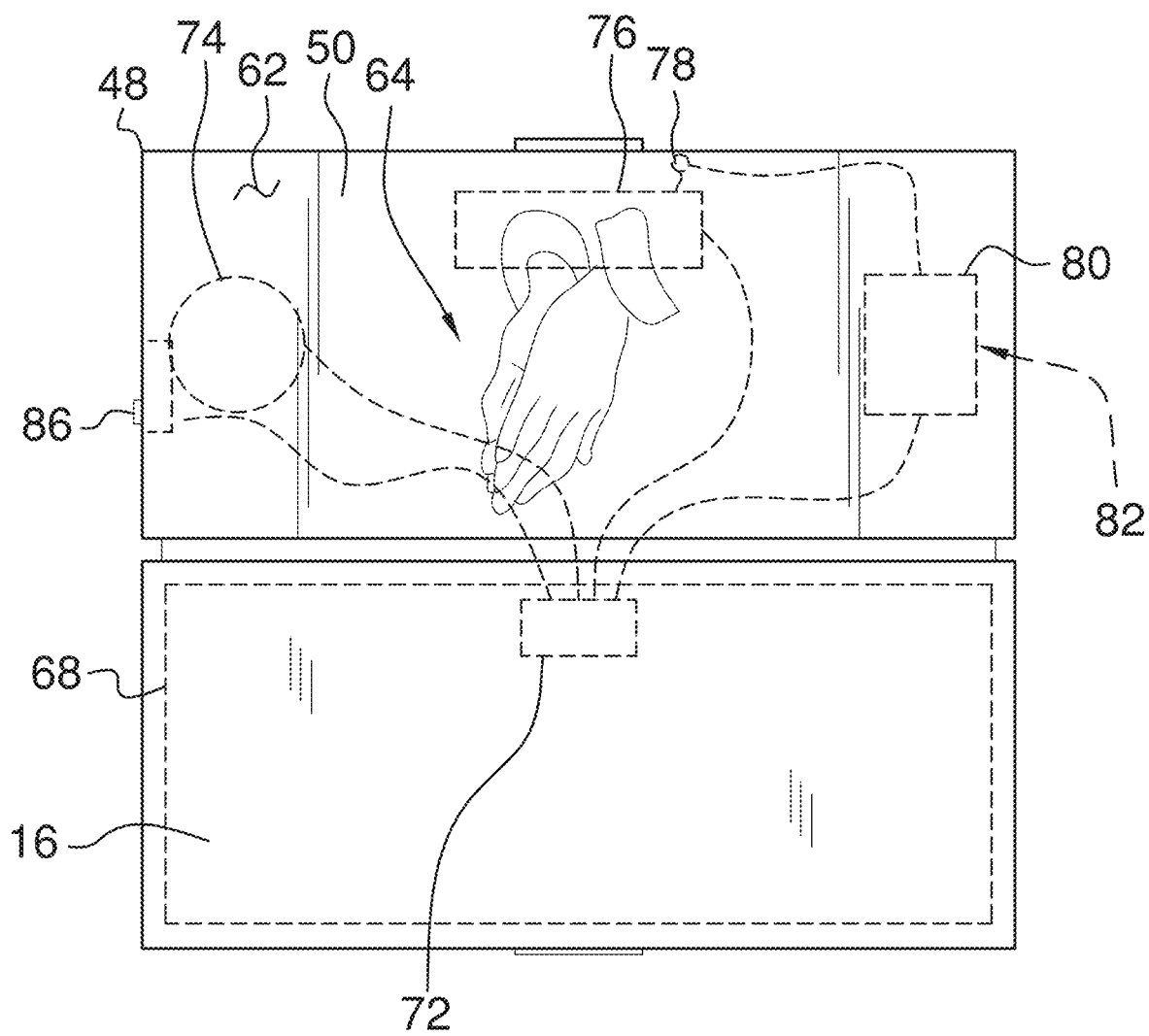
FIG. 3 is a bottom phantom view of an embodiment of the disclosure.
Figure 4:
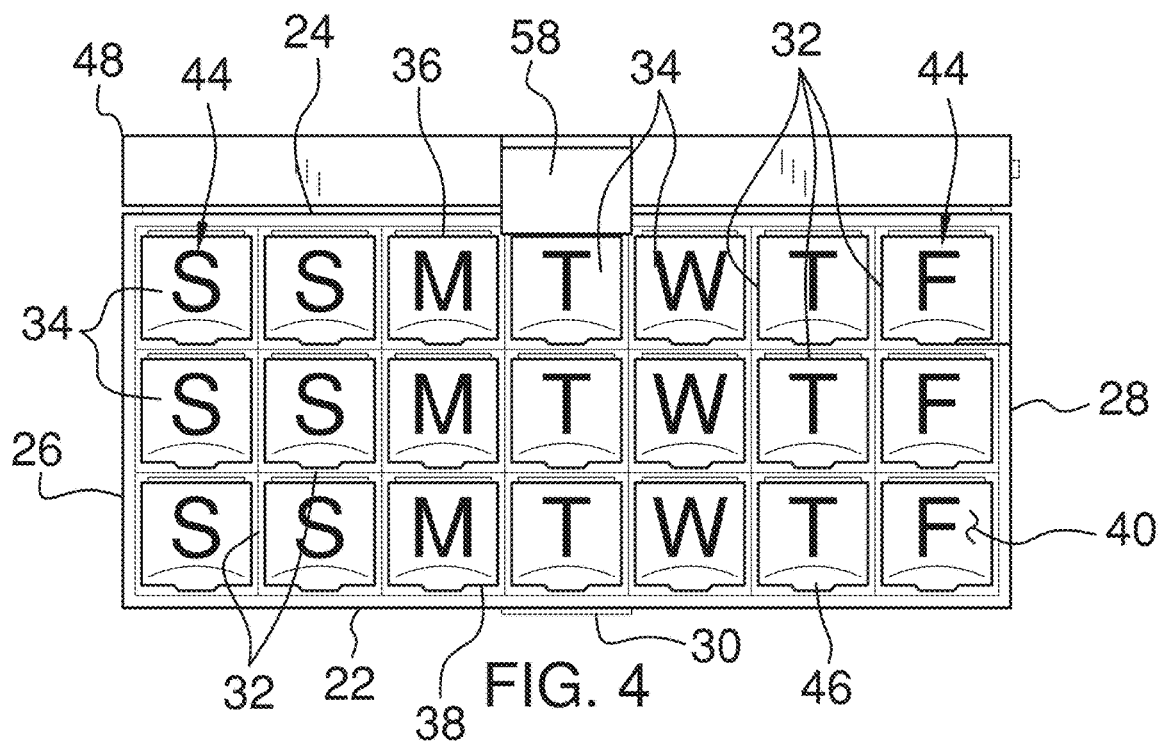
FIG. 4 is a top view of an embodiment of the disclosure.
Figure 5:
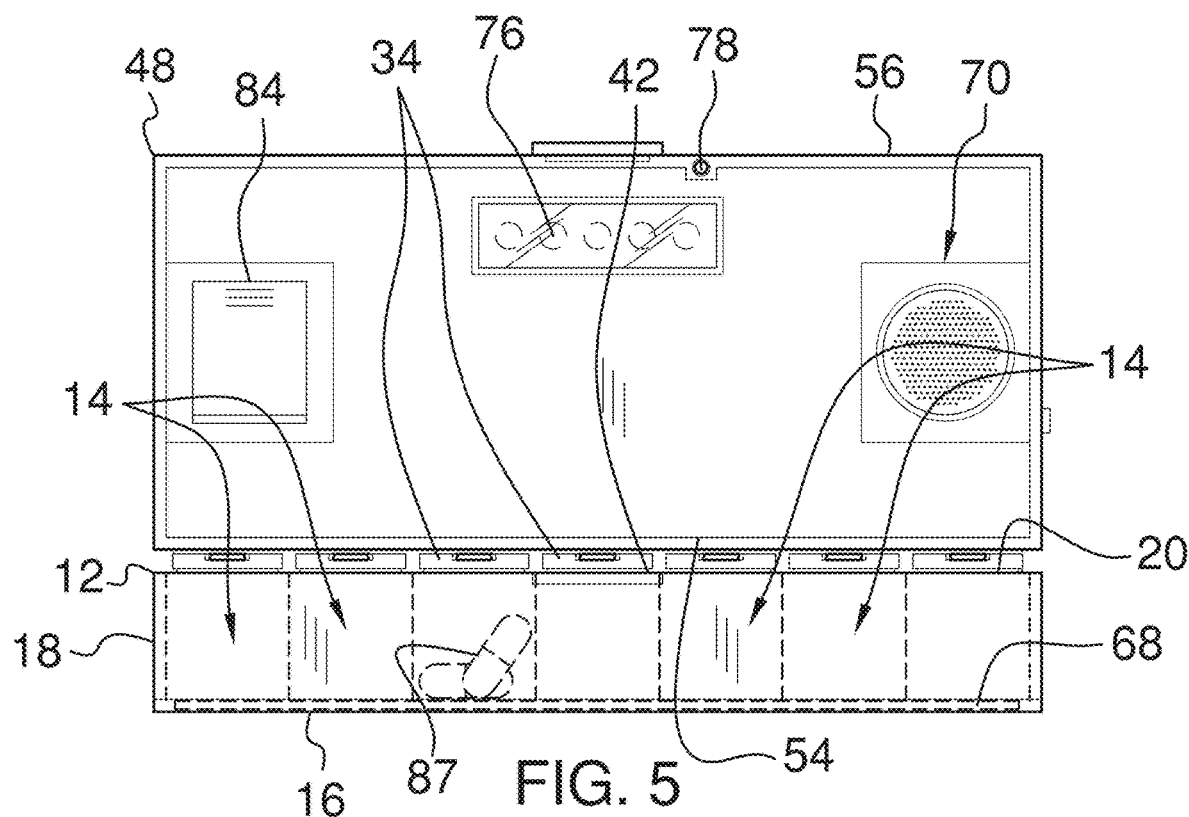
FIG. 5 is a front phantom view of an embodiment of the disclosure.

With reference now to the drawings, and in particular to FIGS. 1 through 5 thereof, a new medication box device embodying the principles and concepts of an embodiment of the disclosure and generally designated by the reference numeral 10 will be described.

As best illustrated in FIGS. 1 through 5, the medication box assembly 10 generally comprises a pill box 12 that has a plurality of compartments 14 each being integrated into the pill box 12 for containing pills 87. The pill box 12 has a bottom wall 16 and a perimeter wall 18 extending upwardly from the bottom wall 16, and the perimeter wall 18 has a distal edge 20 with respect to the bottom wall 16. Furthermore, the perimeter wall 18 has a front side 22, a back side 24, a first lateral side 26 and a second lateral side 28, and an engagement 30 is disposed on the front side 22. A plurality of dividers 32 is integrated into the pill box 12, and the dividers 32 are arranged to intersect each other into a grid such thereby defining each of the compartments 14, Additionally, each of the dividers 32 extends between respective ones of the first lateral side 26, the second lateral side 28, the front side 22 and the back side 24 of the perimeter wall 18.

A plurality of covers 34 is each hingedly disposed on the pill box 12 and each of the covers 34 is aligned with a respective one of the compartments 14 for opening and closing the compartments 14. Each of the covers 34 has a rear edge 36, a front edge 38 and a top surface 40, and the rear edge 36 of each of the covers 34 is hingedly coupled to a top edge 42 of a respective one of the dividers 32. The top surface 40 of each of the covers 34 has indicia 44 printed thereon and the indicia 44 on each of the covers 34 comprise a respective letter for representing a respective day of the calendar week. In this way each of the covers 34 communicates which day of the week the pills 87 in each of the compartments 14 should be consumed. Additionally, the front edge 38 of each of the covers 34 has a tab 46 extending forwardly from the front edge 38 for gripping to open the covers 34.

A lid 48 is hingedly coupled to the pill box 12 for opening and closing the pill box 12. The lid 48 has a top wall 50 and a peripheral wall 52 extending downwardly from the top wall 50, and the peripheral wall 52 has a rear side 54 and a forward side 56. The rear side 54 is hingedly coupled to the distal edge 20 of the back side 24 of the perimeter wall 18 of the pill box 12. The forward side 56 has an engaging element 58 extending downwardly from the forward side 56. The engaging element 58 releasably engages the engagement 30 on the front side 22 of the perimeter wall 18 of the pill box 12 when the lid 48 is closed for retaining the lid 48 in a closed position. The top wall 50 has a bottom surface 60 and a top surface 62, and the top surface 62 of the top wall 50 has indicia 64 printed thereon comprising an inspirational image. Additionally, a battery compartment 66 is recessed into the bottom surface 60 of the top wall 50 of the lid 48.

A weight sensor 68 is integrated into the pill box 12 to sense weight of the pills 87 in the compartments 14. The weight sensor 68 is integrated into the bottom wall 16 of the pill box 12 and the weight sensor 68 may comprise an electronic weight sensor or the like with an operational sensitivity ranging between approximately 20.0 grams and 150.0 grams. An alert 70 is integrated into the lid 48 to emit an audible alert outwardly from the lid 48. The alert 70 is in communication with the weight sensor 68 and the alert 70 is actuated when the weight sensor 68 senses a weight that is below a pre-determined trigger weight. In this way the alert 70 can communicate that the number of pills 87 in the compartments 14 has fallen below a minimum amount.

The alert 70 comprises a control circuit 72 that is integrated into the lid 48 and the control circuit 72 is electrically coupled to the weight sensor 68. The control circuit 72 receives an alert input when the weight sensor 68 senses the weight that is below the pre-determined trigger weight. The alert 70 includes a speaker 74 that is integrated into a bottom surface 60 of the top wall 50 of the lid 48 to emit audible sounds outwardly from the lid 48. The speaker 74 is electrically coupled to the control circuit 72 and the speaker 74 is turned on when the control circuit 72 receives the alert input.

A light emitter 76 is integrated into the lid 48 to emit light outwardly from the light for enhancing visibility of the compartments 14. The light emitter 76 is integrated into the bottom surface 60 of the top wall 50 of the lid 48. A light switch 78 is integrated into the forward side 56 of the peripheral wall 52 of the lid 48 and the light switch 78 is electrically coupled to the light emitter 76. The light switch 78 engages the distal edge 20 of the perimeter wall 18 of the pill box 12 when the lid 48 is closed and the light emitter 76 is turned off when the light switch 78 engages the distal edge 20. Conversely, the light switch 78 disengages the distal edge 20 when the lid 48 is opened and the light emitter 76 is turned on when the light switch 78 engages the distal edge 20.

A power supply 80 is integrated into the lid 48 and the power supply 80 is electrically coupled to the control circuit 72. The power supply 80 comprises a battery 82 that is removably positioned in the battery compartment 66 in the lid 48 and the battery 82 is electrically coupled to the control circuit 72. A battery cover 84 is removably attached to the bottom surface 60 of the lid 48 and battery cover 84 is aligned with the battery compartment 66. The power supply 80 includes a power switch 86 that is slidably integrated into an outside surface 88 of the peripheral wall 52 of the lid 48. The power switch 86 is electrically coupled to the control circuit 72 for turning the control circuit 72 on and off.

In use, each of the compartments 14 is filled with a pre-determined number of pills 87, depending on the prescription that has been provided and each of the pills 87 in each of the compartments 14 is consumed according to the prescription. The light emitter 76 is turned on when the lid 48 is opened to illuminate the compartments 14 in a darkened environment. The speaker 74 emits the audible alarm when the weight sensor 68 senses that the weight of the pills 87 has fallen below the pre-determined trigger weight. In this way a user is alerted that it is time to refill each of the compartments 14 with the appropriate number and type of pills 87.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A medication box assembly for alerting a user when an amount of medication being stored falls below a pre-determined threshold, said assembly comprising:

a pill box having a plurality of compartments each being integrated into said pill box wherein each of said compartments is configured to contain pills;

a plurality of covers, each of said covers being hingedly disposed on said pill box, each of said covers being aligned with a respective one of said compartments for opening and closing said compartments;

a lid being hingedly coupled to said pill box for opening and closing said pill box;

a weight sensor being integrated into said pill box wherein said weight sensor is configured to sense weight of the pills in said compartments;

an alert being integrated into said lid wherein said alert is configured to emit an audible alert outwardly from said lid, said alert being in communication with said weight sensor, said alert being actuated when said weight sensor senses a weight that is below a pre-determined trigger weight wherein said alert is configured to communicate that the number of pills in said compartments has fallen below a minimum amount;

a light emitter being integrated into said lid wherein said light emitter is configured to emit light outwardly from said light for enhancing visibility of said compartments.

2. The assembly according to claim 1, wherein said pill box has a bottom wall and a perimeter wall extending upwardly from said bottom wall, said perimeter wall having a distal edge with respect to said bottom wall, said perimeter wall having a front side, a back side, a first lateral side and a second lateral side, said pill box having a plurality of dividers being integrated into said pill box, said dividers being arranged to intersect each other into a grid such thereby defining each of said compartments, each of said dividers extending between respective ones of said first lateral side, said second lateral side, said front side and said back side of said perimeter wall, said front side of said perimeter wall having an engagement being disposed on said front side.

3. The assembly according to claim 2, wherein;
each of said covers has a rear edge, a front edge and a top surface, said rear edge of each of said covers being hingedly coupled to a top edge of a respective one of said dividers;
said top surface of each of said covers has indicia being printed thereon, said indicia on each of said covers comprising a respective letter for representing a respective day of the calendar week wherein each of said covers is configured to communicate which day of the week the pills in each of said compartments should be consumed; and
said front edge of each of said covers has a tab extending forwardly from said front edge wherein said tab on said front edge of each of said covers is configured to be gripped for opening said covers.

4. The assembly according to claim 2, wherein:
said lid has a top wall and a peripheral wall extending downwardly from said top wall, said peripheral wall having a rear side and a forward side, said rear side being hingedly coupled to said distal edge of said back side of said perimeter wall of said pill box;
said forward side has an engaging element extending downwardly from said forward side, said engaging element releasably engaging said engagement on said front side of said perimeter wall of said pill box when said lid is closed for retaining said lid in a closed position;
said lid has a battery compartment being recessed into said lid; and
said top wall has a bottom surface and a top surface, said top surface of said top wall having indicia being printed thereon, said indicia on said top wall comprising an inspirational image.

5. The assembly according to claim 4, wherein:
said weight sensor is integrated into said bottom wall of said pill box; and
said alert comprises:
a control circuit being integrated into said lid, said control circuit being electrically coupled to said weight sensor, said control circuit receiving an alert input when said weight sensor senses the weight that is below said pre-determined trigger weight; and
a speaker being integrated into a bottom surface of said top wall of said lid wherein said speaker is configured to emit audible sounds outwardly from said lid, said speaker being electrically coupled to said control circuit, said speaker being turned on when said control circuit receives said alert input.

6. The assembly according to claim 4, wherein;
said light emitter is integrated into said bottom surface of said top wall of said lid; and
said assembly includes a light switch being integrated into said forward side of said peripheral wall of said lid, said light switch being electrically coupled to said light emitter, said light switch engaging said distal edge of said perimeter wall of said pill box when said lid is closed, said light emitter being turned off when said light switch engages said distal edge, said light switch disengaging said distal edge when said lid is opened, said light emitter being turned on when said light switch engages said distal edge.

7. The assembly according to claim 4, further comprising a power supply being integrated into said lid, said power supply being electrically coupled to said control circuit, said power supply comprises:
a battery being removably positioned in said battery compartment in said lid, said battery being electrically coupled to said control circuit; and
a power switch being slidably integrated into an outside surface of said peripheral wall of said lid, said power switch being electrically coupled to said control circuit for turning said control circuit on and off.

8. A medication box assembly for alerting a user when an amount of medication being stored falls below a pre-determined threshold, said assembly comprising:
a pill box having a plurality of compartments each being integrated into said pill box wherein each of said compartments is configured to contain pills, said pill box having a bottom wall and a perimeter wall extending upwardly from said bottom wall, said perimeter wall having a distal edge with respect to said bottom wall, said perimeter wall having a front side, a back side, a first lateral side and a second lateral side, said pill box having a plurality of dividers being integrated into said pill box, said dividers being arranged to intersect each other into a grid such thereby defining each of said compartments, each of said dividers extending between respective ones of said first lateral side, said second lateral side, said front side and said back side of said perimeter wall, said front side of said perimeter wall having an engagement being disposed on said front side;
a plurality of covers, each of said covers being hingedly disposed on said pill box, each of said covers being aligned with a respective one of said compartments for opening and closing said compartments, each of said covers having a rear edge, a front edge and a top surface, said rear edge of each of said covers being hingedly coupled to a top edge of a respective one of said dividers, said top surface of each of said covers having indicia being printed thereon, said indicia on each of said covers comprising a respective letter for representing a respective day of the calendar week wherein each of said covers is configured to communicate which day of the week the pills in each of said compartments should be consumed, said front edge of each of said covers having a tab extending forwardly from said front edge wherein said tab on said front edge of each of said covers is configured to be gripped for opening said covers;
a lid being hingedly coupled to said pill box for opening and closing said pill box, said lid having a top wall and a peripheral wall extending downwardly from said top wall, said peripheral wall having a rear side and a forward side, said rear side being hingedly coupled to said distal edge of said back side of said perimeter wall of said pill box, said forward side having an engaging element extending downwardly from said forward side, said engaging element releasably engaging said engagement on said front side of said perimeter wall of said pill box when said lid is closed for retaining said lid in a closed position, said lid having a battery compartment being recessed into said lid, said top wall having a bottom surface and a top surface, said top surface of said top wall having indicia being printed thereon, said indicia on said top wall comprising an inspirational image;

a weight sensor being integrated into said pill box wherein said weight sensor is configured to sense weight of the pills in said compartments, said weight sensor being integrated into said bottom wall of said pill box;

an alert being integrated into said lid wherein said alert is configured to emit an audible alert outwardly from said lid, said alert being in communication with said weight sensor, said alert being actuated when said weight sensor senses a weight that is below a pre-determined trigger weight wherein said alert is configured to communicate that the number of pills in said compartments has fallen below a minimum amount, said alert comprising:

a control circuit being integrated into said lid, said control circuit being electrically coupled to said weight sensor, said control circuit receiving an alert input when said weight sensor senses the weight that is below said pre-determined trigger weight; and a speaker being integrated into a bottom surface of said top wall of said lid wherein said speaker is configured to emit audible sounds outwardly from said lid, said speaker being electrically coupled to said control circuit, said speaker being turned on when said control circuit receives said alert input;

a light emitter being integrated into said lid wherein said light emitter is configured to emit light outwardly from said light for enhancing visibility of said compartments, said light emitter being integrated into said bottom surface of said top wall of said lid;

a light switch being integrated into said forward side of said peripheral wall of said lid, said light switch being electrically coupled to said light emitter, said light switch engaging said distal edge of said perimeter wall of said pill box when said lid is closed, said light emitter being turned off when said light switch engages said distal edge, said light switch disengaging said distal edge when said lid is opened, said light emitter being turned on when said light switch engages said distal edge; and a power supply being integrated into said lid, said power supply being electrically coupled to said control circuit, said power supply comprising:

a battery being removably positioned in said battery compartment in said lid, said battery being electrically coupled to said control circuit; and a power switch being slidably integrated into an outside surface of said peripheral wall of said lid, said power switch being electrically coupled to said control circuit for turning said control circuit on and off.

* * * * *